June 28, 1960 R. SISK 2,942,675
TRASH SHOE FOR ROLLING COULTERS
Filed April 7, 1958
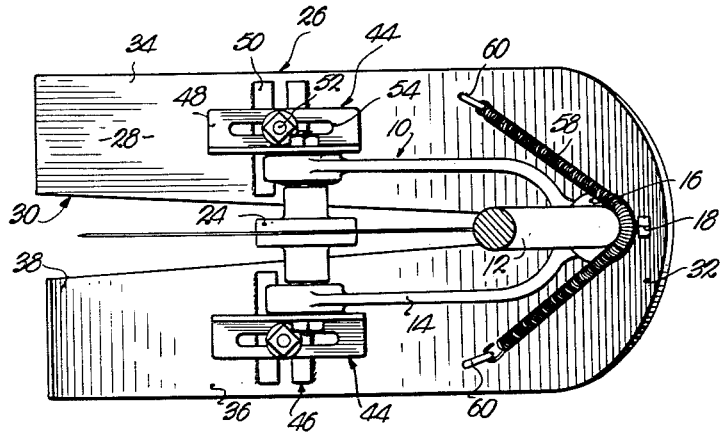
Fig. 1.
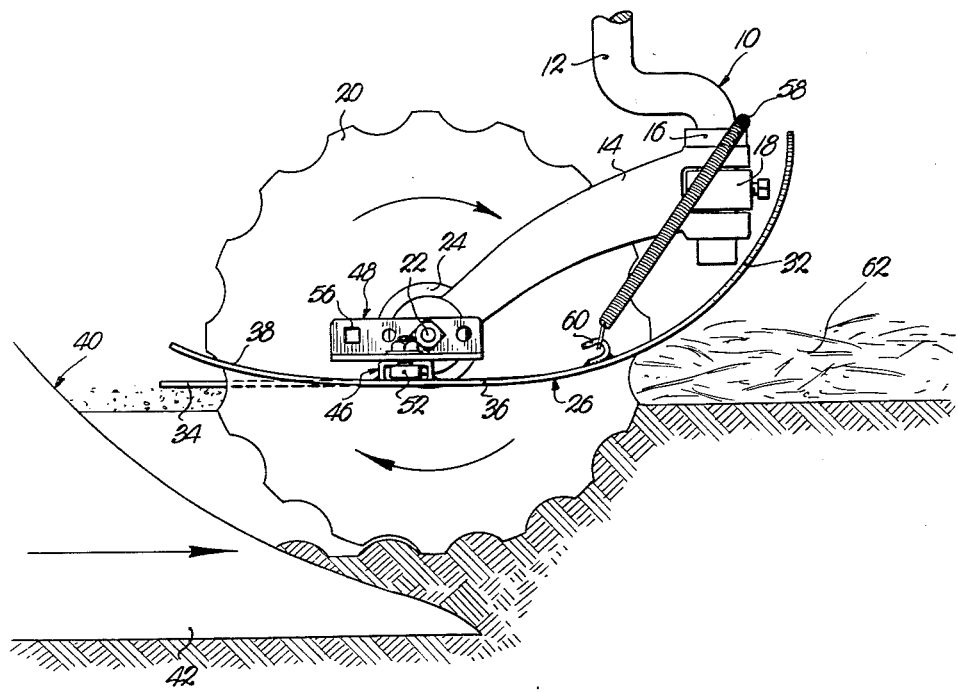
Fig. 2.
INVENTOR.
Ralph Sisk
BY
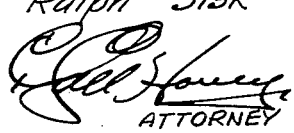
ATTORNEY

United States Patent Office 2,942,675
Patented June 28, 1960

2,942,675

TRASH SHOE FOR ROLLING COULTERS

Ralph Sisk, Orrick, Mo.

Filed Apr. 7, 1958, Ser. No. 726,682

3 Claims. (Cl. 172—514)

This invention relates to improvements in farm implements, and more particularly, plows, the primary object being to provide a trash shoe removably attached to the plow such as to the rolling coulter thereof and operable to press all stalks, grasses, hay and other trash tightly against the ground ahead of the plow to prevent its accumulation and entanglement around the plow beam and/or the coulter-supporting shank.

It is the most important object of the present invention to provide a trash shoe that is universally adapted for attachment to all of the many differing types of rolling coulters in partial embracing relationship to the rotating disc itself and, therefore, in sufficiently close proximity to the plowshare as to effectively perform the functions above explained.

Another important object of the present invention is to provide a trash shoe having additional novel mounting means that permit limited swinging movement of the shoe in response to uneven terrain, the mounting including a swingable pivot about the axle of the rolling coulter as well as spring means having engagement with the rolling coulter unit.

In the drawing:

Fig. 1 is a horizontal, cross-sectional view through the supporting shank of a rolling coulter presenting therefore, a top plan view of the trash shoe forming the subject matter of the instant invention; and Fig. 2 is a vertical, cross-sectional view through the ground illustrating the trash shoe and its relationship to the plowshare and the rolling coulter.

The rolling coulter unit 10 chosen for illustration conventionally includes a shank 12 that depends from the beam (not shown) of a plow, and which shank 12 supports a yoke 14 for horizontal swinging movement between a collar 16 on the shank 12 and a set collar 18. The yoke 14 in turn rotatably supports a coulter disc 20 through the medium of an axle 22 passing through hub 24 rigid to the disc 20.

Trash shoe 26 forming the subject matter of the instant invention, includes an initially flat, elongated plate 28 having a slot or notch 30 extending longitudinally thereof from the normally rearmost end of plate 28, terminating adjacent an upwardly-flared, forwardmost end 32. The notch 30 is preferably V-shaped and sufficiently long to accommodate discs 20 of various diameters, presenting a pair of fingers 34 and 36, one on each side respectively of the disc 20. The rearmost end 38 of the finger 36 is flared upwardly as best seen in Fig. 2, to clear the ground that is constantly being raised by plowshare 40, finger 36 being proximal to landside 42 of the plow.

Bracket means broadly designated by the numeral 44, is provided for each finger 34 and 36 respectively to detachably mount the trash shoe 26 upon the unit 10 and particularly, for swinging movement about the axis of axle 22. Each bracket 44 includes a fixture 46 and a coupler 48. The fixtures 46, welded or otherwise secured to the upper faces of the fingers 34 and 36 consist of opposed, transversely L-shaped angles 50 spaced apart to present a slot therebetween for slidably receiving a bolt 52, the head whereof is confined against upward movement by the angles 50.

Couplers 48 are likewise L-shaped and disposed in traversing relationship to the fixtures 46. Slots 54 in the couplers 48 receive the bolts 52 and a series of openings 56 in the couplers 48, receive the axle 22. Since the nature of the axles 22 vary among differing types of rolling coulters, openings 56 likewise vary in diameter and configuration. The diameters of the discs 20 and the distance across the yokes 14, determine the positions of the couplers 48 with respect to the fixtures 46 and such adjustment may be made by loosening the bolts 52. Obviously, if the axles 22 forming an original part of the units 10 are too short to receive the couplers 48, an additional bolt may be supplied for such purpose with the trash shoe 26 when the latter is manufactured and distributed.

A coil spring 58 is provided to support the forwardmost end of the plate 28. Hooks 60 on the upper faces of the fingers 34 and 36 receive the ends of the spring 58 which is looped over the unit 10, particularly adjacent the zone of connection between the yoke 14 and the shank 12. As illustrated, the spring 58 is looped over the uppermost collar 16.

Consequently, the shoe 26 is permitted to swing vertically about the axis of the axle 22, but when the plow and coulter unit 10 are raised out of the ground, the spring 58 adequately supports the forwardmost end of the plate 28.

The use of the trash shoe 26 is adequately illustrated in Fig. 2 of the drawing, showing how the plate 28 slides over trash 62 pressing the latter tightly to the ground, thereby preventing entanglement with the unit 10 and providing adequate coverage by the plowed ground before the trash 62 is able to collect around the beam of the plow.

Having thus described the invention what is claimed as new and desired to be secured by Letters Patent is:

1. For use with a plow having a rolling coulter unit including a coulter disc suspended from the plow beam forwardly of the plowshare by a shank having a yoke swingable horizontally thereon and receiving the disc through the medium of an axle, a trash shoe comprising an elongated plate adapted to slide on the ground beneath said axle and provided with a longitudinal slot extending forwardly from the rearmost end thereof for clearing the disc, presenting a pair of elongated fingers, one on each side respectively of the disc, said plate having a forwardmost, upwardly-flared end integrally interconnecting the fingers; adjustable bracket means on each finger respectively adapted for attachment of the plate to said axle for vertical swinging movement; and spring means on the plate engageable with said unit for limiting the extent of downward swinging movement of said forwardmost end of the plate.

2. For use with a plow having a rolling coulter unit including a coulter disc suspended from the plow beam forwardly of the plowshare by a shank having a yoke swingable horizontally thereon and receiving the disc through the medium of an axle, a trash shoe comprising an elongated plate adapted to slide on the ground beneath said axle and provided with a longitudinal slot extending forwardly from the rearmost end thereof for clearing the disc, presenting a pair of elongated fingers, one on each side respectively of the disc, said plate having a forwardmost, upwardly-flared end integrally interconnecting the fingers; adjustable bracket means on each finger respectively adapted for attachment of the plate to said axle for vertical swinging movement, said bracket means including a pair of opposed fixtures secured to the upper face of the plate; and a spring adapted to be looped over said unit adjacent the connection between the shank and the yoke for limiting the extent of downward swinging movement of said forwardmost end of the plate, said spring having a pair of ends each attached to a respective finger.

3. For use with a plow having a rolling coulter unit including a counter disc suspended from the plow beam forwardly of the plowshare by a shank having a yoke swingable horizontally thereon and receiving the disc through the medium of an axle, a trash shoe comprising an elongated plate adapted to slide on the ground beneath said axle and provided with a longitudinal slot extending forwardly from the rearmost end thereof for clearing the disc, presenting a pair of elongated fingers, one on each side respectively of the disc, said plate having a forwardmost, upwardly-flared end integrally interconnecting the fingers; adjustable bracket means on each finger respectively adapted for attachment of the plate to said axle for vertical swinging movement, each of said bracket means including a fixture rigid to the plate and a coupler attached to the fixture for fore and aft movement and for lateral movement toward and away from said yoke; and spring means on the plate engageable with said unit for limiting the extent of downward swinging movement of said forwardmost end of the plate.

References Cited in the file of this patent

UNITED STATES PATENTS

| | | |
|---|---|---|
| 2,161,714 | Lindelof | June 6, 1939 |
| 2,280,107 | Stute | Apr. 21, 1942 |
| 2,487,609 | Sparks | Nov. 8, 1949 |

FOREIGN PATENTS

| | | |
|---|---|---|
| 602,391 | Great Britain | May 26, 1948 |
| 6,956 | Sweden | Jan. 22, 1896 |